Nov. 24, 1925.
O. BÖHM
1,563,009
DYNAMO ELECTRIC MACHINE
Filed Nov. 6, 1923
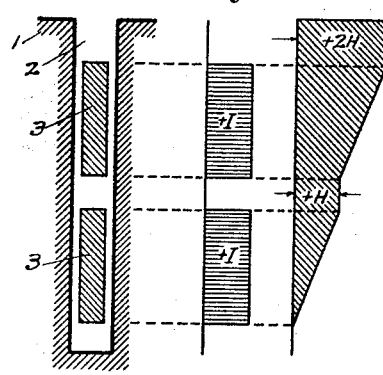
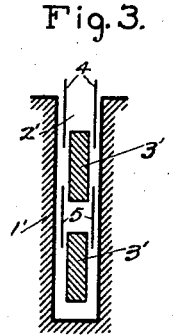
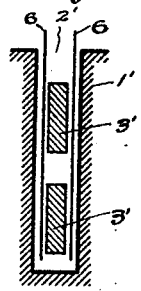
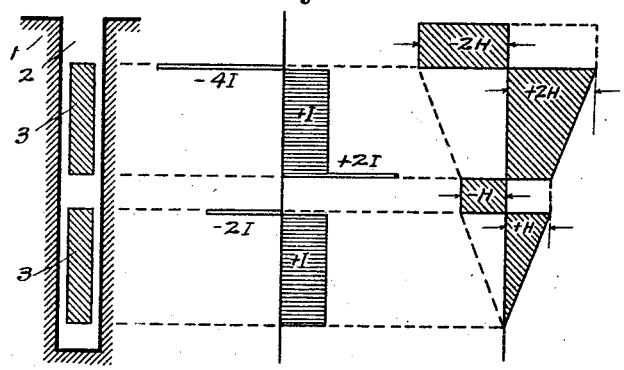
Inventor:
Otto Böhm;
by
His Attorney Patented Nov. 24, 1925.

1,563,009

UNITED STATES PATENT OFFICE.

OTTO BÖHM, OF BERLIN, GERMANY, ASSIGNOR TO GENERAL ELECTRIC COMPANY, A CORPORATION OF NEW YORK.

DYNAMO-ELECTRIC MACHINE.

Application filed November 6, 1923. Serial No. 673,178.

*To all whom it may concern:*

Be it known that I, OTTO BÖHM, a citizen of Germany, residing at Berlin, Germany, have invented certain new and useful Improvements in Dynamo-Electric Machines, of which the following is a specification.

My invention relates to direct current dynamo-electric machines of the commutator type and has for its object to improve the commutation of such machines.

As is well known, eddy currents are developed in the armature conductors of commutating machines, such as direct current generators, motors and the like, which tend to neutralize a portion of the reactance voltage of the commutated armature coil which is produced by the slot leakage flux. These eddy currents tend therefore to improve the commutation. The slot leakage flux, however, which traverses the slot between the conductors or above them, produces a voltage in the conductors undergoing commutation which must be commutated.

In accordance with my invention, suitable eddy current paths are provided for the slot leakage flux which is not cut by the conductors, whereby the whole slot leakage flux is utilized to produce eddy currents which in turn produce a voltage which neutralizes the reactance voltage of the commutated armature coil.

For a better understanding of my invention, reference may be had to the following description taken in connection with the accompanying drawing, in which Figs. 1 and 2 are explanatory diagrams; Fig. 3 shows a portion of an armature to which my invention is applied, and Fig. 4 shows a portion of an armature embodying a modification of my invention.

For the purpose of explanation, it will be assumed that the entire current $I$ of every slot momentarily reverses in direction during commutation, whereupon eddy currents are produced in such a direction that the slot leakage flux in so far as it cuts the conductors remains unchanged during the instant after commutation is completed. The formation of eddy currents starts at the edge of the conductor and spreads to the interior of the bar, thus gradually reversing the slot leakage flux. This gradual reversal of the slot leakage flux reduces the commutation voltage, and therefore tends to produce sparkless commutation.

In Fig. 1 there is shown an armature 1 having a slot 2 with armature conductors 3 therein connected up to a suitable commutator (not shown). In this figure there is shown the distribution of the current in the conductors and the distribution of the stray slot flux just prior to commutation. $I$ represents the distribution of current in the conductor and the shaded figure to the right shows the distribution of the magneto-motive force or stray field flux. This flux has a magnitude $H$ throughout the portion of the slot immediately at the top of the lower conductor and is substantially uniform throughout the slot to the bottom of the top conductor and then gradually increases to a value of $2H$ at the top of the top conductor and remains at this value throughout the remainder of the height of the slot.

In Fig. 2 is shown the same arrangement of armature 1 having a slot 2 and conductors 3, the shaded portions of this figure showing the distribution of current and flux immediately after commutation has taken place, with the assumption made above. It will be understood that the reversal of that portion of the stray slot flux through the conductors has not taken place, although that portion of the flux which traverses the slot between the conductors and the top conductor has taken place. If the reversal of this flux is not retarded, currents $2I$ and $4I$ are produced in the conductors 3 which must be commutated, since these currents flow in a direction opposite to that through the brushes of the machine. Such currents will produce sparking at the brushes. In accordance with my invention, the reversal of the entire stray slot flux is retarded by arrangement of suitable eddy current paths. This is accomplished by means of sheets of non-magnetic, electrical conductive material located in the slots and extending vertically therein. Such constructions are shown in Figs. 3 and 4, in which 1' is the armature, 2' the slots, 3' the conductors. In Fig. 3, 4 and 5 are the sheets of copper or other non-magnetic electrical conductive material located in the slot, each of said sheets being electrically independent of the other of said sheets. In Fig. 4, 6 are similar sheets. The sheets 4, 5 and 6 extend beyond the upper edges of the conductors in the slots in order that eddy currents flow in them in those portions of the slot in which the stray slot flux crosses the slot between the conductors or above the top conductor. If the conductors are deep, it is only necessary to introduce these sheets in that portion of the slots in which no conductor lies, that is, between the conductors as shown in Fig. 3 by the sheets 5, and in that portion of the slots above the conductors as shown by the sheets 4.

In Fig. 4 the sheets 6 extends throughout the whole depth of the slot.

My arrangement is particularly effective in such armatures in which fine wire windings are used as, for example, in high voltage direct current machines. I desire it to be understood that my invention is not limited to the particular arrangement shown and described, and I aim in the appended claims to cover all modifications which do not depart from the spirit and scope of my invention.

What I claim as new and desire to secure by Letters Patent of the United States, is,—

1. In a direct current dynamo-electric machine, an armature provided with slots, a commutated armature winding in said slots, and sheets of non-magnetic, electrical conductive material located in said slots and extending vertically therein, each of said sheets being electrically independent of the other of said sheets.

2. In a direct current dynamo-electric machine, an armature provided with slots, a commutated armature winding in said slots, and sheets of non-magnetic, electrical conductive material located in said slots on both sides of the conductors of said winding and extending vertically in said slots, each of said sheets being electrically independent of the other of said sheets.

3. In a direct current dynamo-electric machine, an armature provided with slots, a commutated armature winding in said slots, and sheets of non-magnetic, electrical conductive material located in said slots and extending vertically therein and beyond the upper edges of the conductors of said winding, each of said sheets being electrically independent of the other of said sheets.

4. In a direct current dynamo-electric machine, an armature provided with slots, a commutated armature winding in said slots, and sheets of non-magnetic, electrical conductive material located in said slots on both sides of the conductors of said winding and extending vertically in said slots beyond the upper edges of said conductors, each of said sheets being electrically independent of the other of said sheets.

In witness whereof, I have hereunto set my hand this 15 day of October, 1923.

Dr. OTTO BÖHM.